US011218052B2

United States Patent
Gassner (10) Patent No.: US 11,218,052 B2
(45) Date of Patent: Jan. 4, 2022

(54) LINEAR ACTUATOR

(71) Applicant: Iimoss (Dongguan) Co., Ltd., Guangdong (CN)

(72) Inventor: Christian Gassner, Dongguan (CN)

(73) Assignee: Iimoss (Dongguan) Co., Ltd., Guangdong (CN)

( * ) Notice: Subject to any disclaimer, the term of this patent is extended or adjusted under 35 U.S.C. 154(b) by 167 days.

(21) Appl. No.: 16/584,895

(22) Filed: Sep. 26, 2019

(65) Prior Publication Data

US 2020/0028406 A1    Jan. 23, 2020

Related U.S. Application Data

(63) Continuation of application No. PCT/CN2018/086878, filed on May 15, 2018.

(51) Int. Cl.
| | |
|---|---|
| *H02K 5/22* | (2006.01) |
| *H02K 11/30* | (2016.01) |
| *F16H 1/16* | (2006.01) |
| *F16H 25/20* | (2006.01) |

(Continued)

(52) U.S. Cl.
CPC .............. *H02K 5/225* (2013.01); *F16H 1/16* (2013.01); *F16H 25/2015* (2013.01); *H02K 7/06* (2013.01); *H02K 7/116* (2013.01); *H02K 11/30* (2016.01); *F16H 2025/209* (2013.01); *F16H 2025/2046* (2013.01); *H02K 2211/03* (2013.01)

(58) Field of Classification Search
CPC .......... H02K 5/225; H02K 11/30; H02K 7/06; H02K 7/116; H02K 2211/03; F16H 1/16; F16H 25/2015; F16H 2025/2046; F16H 2025/209
See application file for complete search history.

(56) References Cited

U.S. PATENT DOCUMENTS

| 6,099,325 A | 8/2000 | Parkhill | |
|---|---|---|---|
| 2004/0093969 A1* | 5/2004 | Nielsen | H02K 7/06 74/89.23 |

(Continued)

FOREIGN PATENT DOCUMENTS

| CN | 1468350 | 1/2004 |
|---|---|---|
| CN | 2829197 | 10/2006 |

(Continued)

OTHER PUBLICATIONS

"Office Action of China Counterpart Application", dated Nov. 3, 2020, p. 1-p. 8.

*Primary Examiner* — Zakaria Elahmadi
(74) *Attorney, Agent, or Firm* — JCIPRNET (57) ABSTRACT

A linear actuator comprises a housing, inside which a spindle assembly, a push rod assembly driven by the spindle assembly, a limit switch for limiting stroke of the push rod assembly, and a motor for driving the spindle assembly are mounted. A connecting seat is disposed on the circuit board for centralizing connection terminals. The motor is electrically connected to the connection terminals. The housing is provided with a plug-in window aligned to the connecting seat. An electric plug of the linear actuator passes through the plug-in window and is plugged into the connecting seat. The electric plug and the housing are fastened together via a mounting component.

18 Claims, 5 Drawing Sheets

(51) Int. Cl.
*H02K 7/06* (2006.01)
*H02K 7/116* (2006.01)

(56) References Cited

U.S. PATENT DOCUMENTS

| | | | | |
|---|---|---|---|---|
| 2009/0256440 | A1* | 10/2009 | Kragh | H02K 7/06 310/89 |
| 2010/0311260 | A1* | 12/2010 | Knudsen | H01R 13/6395 439/148 |
| 2011/0100141 | A1* | 5/2011 | Inoue | F16H 25/2015 74/25 |
| 2013/0285494 | A1* | 10/2013 | Iversen | F16H 25/20 310/83 |
| 2015/0289665 | A1* | 10/2015 | Klimm | A47C 20/046 74/89.14 |
| 2016/0025199 | A1* | 1/2016 | Boone | B64C 13/50 74/89.38 |
| 2016/0273617 | A1* | 9/2016 | Nickel | B60N 2/919 |
| 2017/0222516 | A1* | 8/2017 | Sorensen | F16H 25/20 |
| 2017/0324301 | A1* | 11/2017 | Jorgensen | F16H 35/18 |
| 2017/0324302 | A1* | 11/2017 | Jorgensen | H02K 5/225 |
| 2017/0338714 | A1* | 11/2017 | Jorgensen | H02K 7/116 |
| 2017/0363189 | A1* | 12/2017 | Nunez | F16H 25/2006 |
| 2018/0016822 | A1* | 1/2018 | Sturm | E05B 81/40 |
| 2018/0355958 | A1* | 12/2018 | Graham | F16H 25/2454 |
| 2019/0232819 | A1* | 8/2019 | Hoffmann | H02K 5/26 |
| 2019/0291604 | A1* | 9/2019 | Angerer | F16H 1/16 |

FOREIGN PATENT DOCUMENTS

| | | |
|---|---|---|
| CN | 101232220 | 7/2008 |
| CN | 201656681 | 11/2010 |
| CN | 102118078 | 7/2011 |
| CN | 103795180 | 5/2014 |
| CN | 104124562 | 10/2014 |
| EP | 0831250 | 3/1998 |

* cited by examiner

LINEAR ACTUATOR

CROSS-REFERENCE TO RELATED APPLICATION

This is a continuation of International Application No. PCT/CN2018/086878, filed on May 15, 2018. The entirety of the above-mentioned patent application is hereby incorporated by reference herein and made a part of this specification.

BACKGROUND

Technical Field

The present application relates to the field of drive device, more particularly, to a linear actuator.

Description of Related Art

Linear actuators, as driving apparatuses, are mainly used to transform rotary motions of a motor to linear or linear reciprocating motions. As operational electrical machines, the linear actuators may achieve long-distance control, centralized control and automatic control. For example, the actuators may apply to equipment, such as an electrical medical bed, an electric chair and an electrical sofa, to drive moving components of the equipment to move upwards or downwards.

Electrical components within the actuators, such as a circuit board, a sensor and a motor, need a wire to connect with a power source or external control component for electrical connection. Normally, one end of the wire inside an actuator housing is welded or plugged into the circuit board within the housing, and the other end of the wire extrudes beyond the housing. The lines of the wire wind among the components within the housing, making the arrangement of the components inside the housing disorderly. If the wiring falls off, the normal operations of a moving component, such as a spindle and spindle nut assembly or a moving push rod assembly, may be affected. At the same time, if lacking of wiring design, a housing of a general actuator requires a plurality of input-and-output interfaces which are for wire inlead, a power source terminal, a control terminal or wire outlet, which makes the overall appearance of the actuator complex.

Furthermore, when existing actuators need to adjust wiring therein or replace the wiring wire, only the housing of the actuator can be un-assembled to complete the adjustment of the wires or the replacement of wirings on the circuit board, which is inconvenient for operation, time-consuming and painstaking. Furthermore, an actuator with a housing provided with a plurality of interfaces is cumbersome for user and the appearance of the actuator is unaesthetic.

Therefore, the existing linear actuator technology requires to be improved and developed.

SUMMARY

An embodiment of the present application provides a linear actuator with a housing. Circuit wirings of electric components inside the housing are centralized onto a circuit board. A connecting seat is further disposed on the circuit board, and connection terminals are centralized inside the connecting seat. By providing a sole window on the housing for connecting an electrical plug of an external cable, it's convenient to adjust and replace the external cable, which is also convenient for user and the appearance of the actuator is aesthetic.

An embodiment of the present application provides a linear actuator, which includes a housing, and a spindle assembly, a push rod assembly driven by the spindle assembly, a limit switch for limiting stroke of the push rod assembly, and a motor for driving the spindle assembly, which are all assembled in the housing; the limit switch is disposed on a circuit board, wherein a connecting seat is also disposed on the circuit board for centralizing connection terminals, the motor being electrically connected to the connection terminals, the housing being provided with a plug-in window aligned to the connecting seat, an electric plug passing through the plug-in window and being plugged into the connecting seat, the electric plug and the housing being fastened together via a mounting component.

Preferably, the housing includes a first housing and a second housing, which are correspondingly provided with pre-assembled structure.

For ease of assembly, the pre-assembled structure includes a plurality of slots and buckles coordinating with each other, the first housing being arranged with the plurality of slots, the second housing being arranged with the plurality of buckles, the first housing being further arranged with a screw hole, the second housing being provided with a mounting hole corresponding to the screw hole; after completing the pre-assembly, a screw passes through the mounting hole and is locked into the screw hole so as to lock the first housing and the second housing, the plug-in window being arranged on the first housing or the second housing.

In an embodiment, the plurality of slots are disposed at a periphery edge of an inner wall of the first housing; the plurality of buckles respectively coordinating with the slots for the pre-assembly are disposed at a periphery edge of an inner wall of the second housing, each buckle having an arm and a clasp.

Preferably, the spindle assembly includes a spindle and a bevel gearwheel which is integrally formed with the spindle, an output of the motor being connected to a motor shaft, the bevel gearwheel engaging with the motor shaft.

The push rod assembly includes a spindle nut sleeving around and engaging with the spindle, and a push rod fixed onto the spindle nut.

For extending relative components, the push rod is hollow, and a free end of the push rod is provided with a mounting slot to form a connecting portion.

Wherein the limit switch is mounted on the circuit board, the limit switch includes a first microswitch and a second microswitch which are all mounted on the circuit board, the connecting seat being disposed on the circuit board.

The first microswitch is provided with a first limit convex brim, and the second microswitch is provided with a second limit convex brim, the spindle nut being arranged between the first microswitch and the second microswitch, wherein an external edge of the spindle nut is limited between the first limit convex brim and the second limit convex brim, so as to limit stroke of the spindle nut on the spindle, thus determining an operation stroke of the push rod.

For saving working procedures and cost, the bevel gearwheel and the spindle constitute a plastic component molded in one-piece.

As an embodiment of the mounting component, the mounting component includes an electric plug mounting component and a housing mounting component coordinating with each other, the housing mounting component includes the sliding slots arranged on edges of two sides of the plug-in window and a limit rib, the electric plug mounting component is a snap joint.

Preferably, the electric plug includes a body and a drive seat, the drive seat is disposed within the body and having connection terminals, the drive seat connecting to an external cable.

Where the housing is provided with a wire containing mechanism including a wire containing component and a wrapping post. The external cable is connected to the electric plug while passing through the wire containing component and/or winding around the wrapping post.

Furthermore, a plug cover is disposed between the drive seat and the connecting seat, the connection terminals of the connecting seat and the connection terminals of the drive seat are connected in alignment via the plug cover.

For extending relative components, the housing is provided with a pre-positioned component, a mounting portion is detachably fixed onto the pre-positioned component.

Beneficial Effect

Beneficial effect of the embodiment in the present application includes: in the linear actuator of the embodiment, control and drive wirings of the electric components inside the housing are centralized in the circuit board; the connecting seat is disposed on the circuit board; the connection terminals are centralized on the connecting seat; the plug-in window is disposed on the housing, and all the wires are configured externally. Therefore, when the linear actuator is applied to a particular device, the wires may be replaced based on the particular device conveniently. By plugging a single electric plug, the wires may be adjusted or replaced conveniently. The setting of the centralized electric plug reduces the quantity of interfaces provided on the housing, and integrates prior multiple interfaces into one single plug-in window, achieving a simple and aesthetic design for the linear actuator.

BRIEF DESCRIPTION OF THE DRAWINGS

One or more embodiments will be described for exemplary purpose in accompany with corresponding drawings, which descriptions do not constitute limitation to embodiments of the present disclosure. Like reference numbers labeled in the drawings indicate similar components. Unless otherwise indicated, the drawings do not constitute limitation to the present disclosure.

DESCRIPTION OF THE EMBODIMENTS

In order to illustrate the purpose, technical solutions and the advantages of the present application more clearly, the present application will be described below in further details with reference to the drawings and embodiments. It is to be understood that specific embodiments described herein are merely for explaining, instead of limiting the present application.

Figure 1:
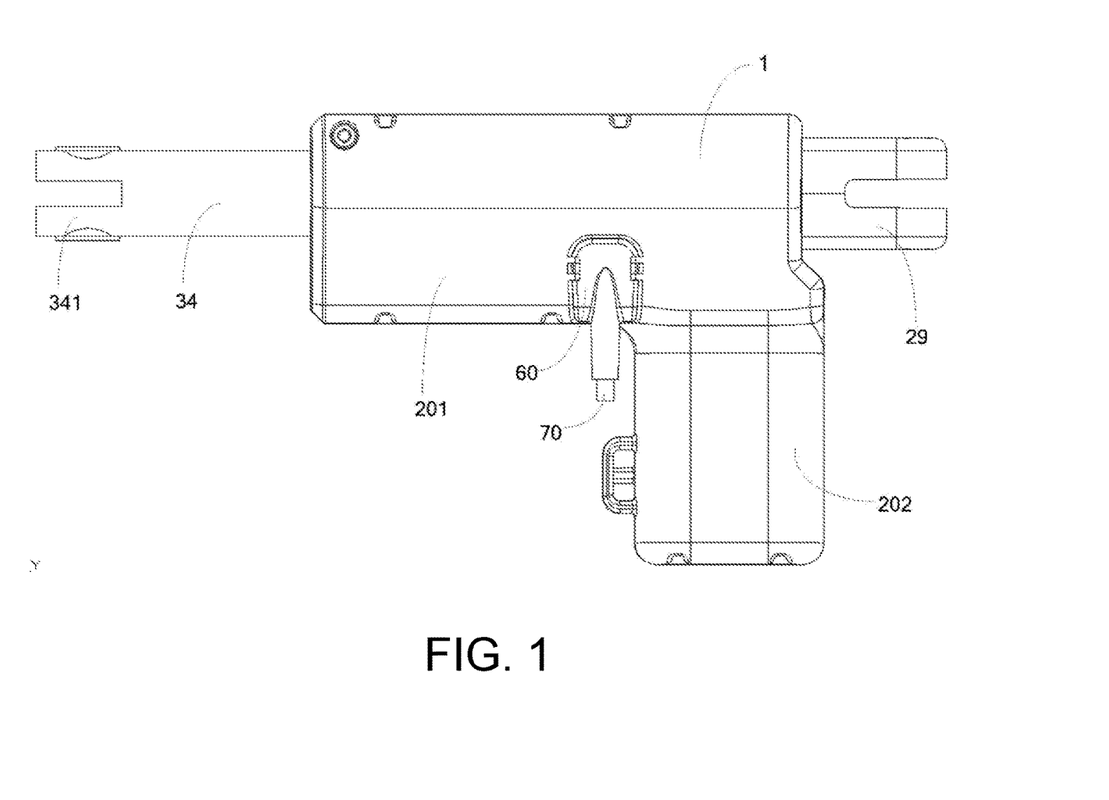
FIG. 1 is an elevation structural view of a linear actuator provided by an embodiment of the present application.
Figure 2:
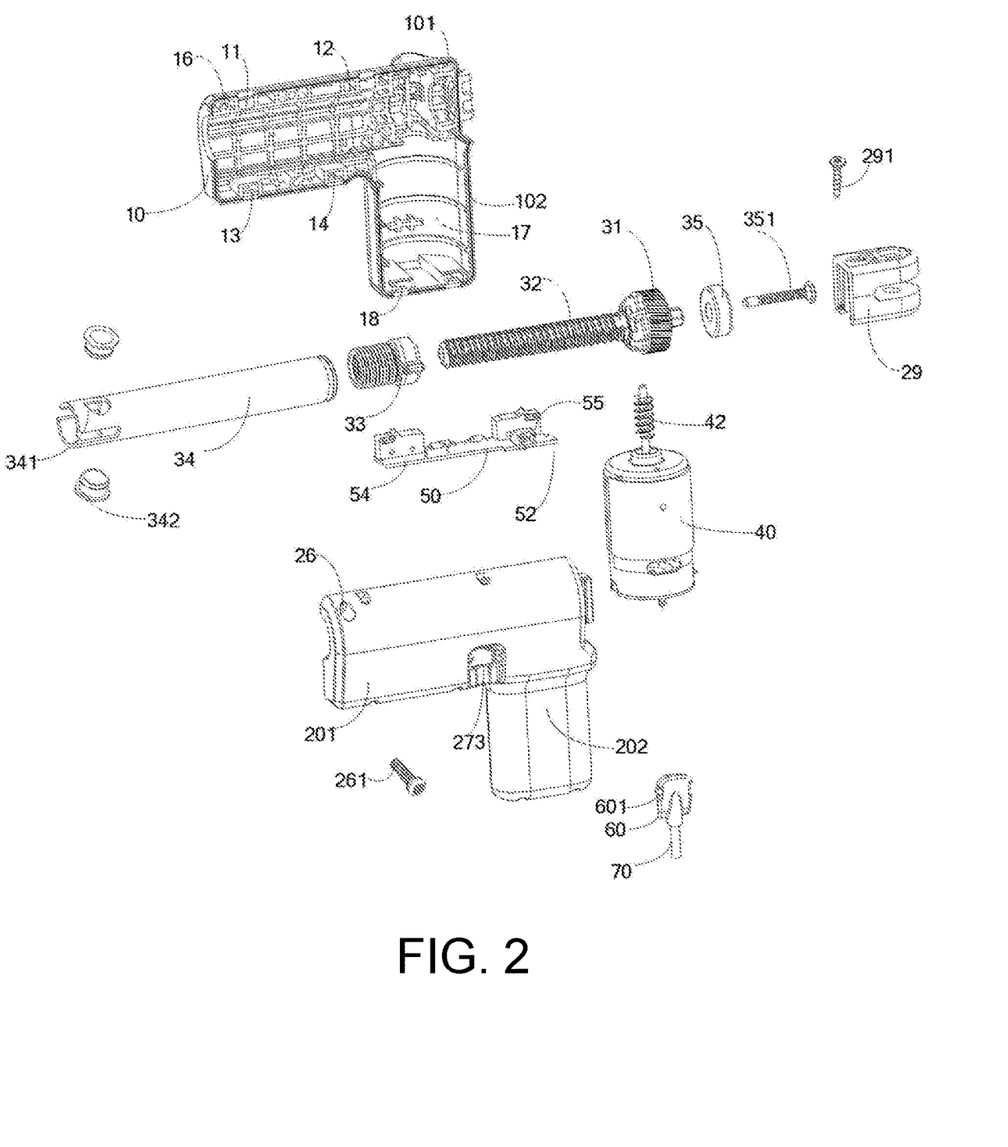
FIG. 2 is an exploded structural view of the linear actuator provided by the embodiment of the present application.

Referring to FIG. 1 and FIG. 2, one of the improvements of an improved linear actuator in the present application is that electric components inside a housing 1 are centralized and arranged on a circuit board; by providing a connecting seat on the circuit board, connection terminals are centralized on the newly-provided connecting seat; a plug-in window 273 is disposed on the housing 1, and all the wires are configured externally except the wires of the motor itself. When the linear actuator is applied to a particular device, the wires may be replaced based on the particular device conveniently. At the same time, the setting of the centralized electric plug can reduce the quantity of interfaces provided on the housing 1, and integrate prior multiple interfaces into one single plug-in window 273, achieving a simpler appearance for the linear actuator.

The linear actuator includes the housing 1, and a spindle assembly, a push rod assembly driven by the spindle assembly, a circuit board 50, a limit switch for limiting stroke of the push rod assembly, and a motor 40 for driving the spindle assembly, which are mounted in the housing 1.

Referring together with FIG. 2, a connecting seat 52 is disposed on the circuit board 50 for centralizing the connection terminals. The motor 40 is electrically connected to the connection terminals on the connecting seat 52. The connection terminals of the connecting seat 52 also provide with drive and control connections for the circuit board 50. The limit switch may also be connected to the circuit board 50. In another embodiment, the limit switch may be driven or controlled via the circuit board 50.

Figure 4:
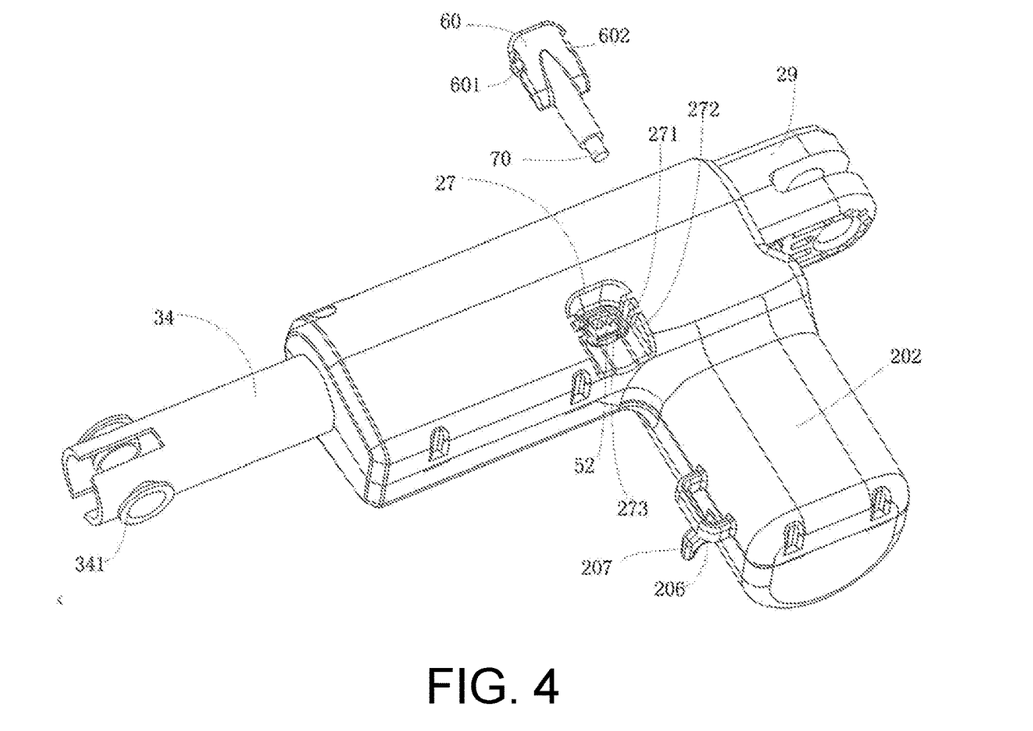
FIG. 4 is view showing a plugging relation between a housing and an electric plug of the linear actuator provided by the embodiment of the present application.

Referring together with FIG. 4, the housing 1 is dented to form a concave area 27 where the plug-in window 273 is provided. An electric plug 60 of the linear actuator passes through the plug-in window 273 and is plugged into the connecting seat 52. The electric plug 60 and the housing 1 are fastened together via a mounting component.

In the present embodiment, merely the plug-in window 273 is provided on the housing 1 of the linear actuator; the wires inside the housing 1 are centralized onto the connecting seat 52 so as to simplify inner wiring design of the device; at the same time, all external cables are bundled into a uniform wire through the electric plug 60 and been set up externally. When the linear actuator is applied to different devices, different wires may be replaced merely by plugging and unplugging simply and conveniently according to particular requirements of the devices.

At the same time, the circuit board 50 disposed inside the housing 1 integrates the connecting seat 52 as a female seat of the wires. The connecting seat 52 is correspondingly located at the plug-in window 273 for the ease of connection to the electric plug 60.

Figure 7:
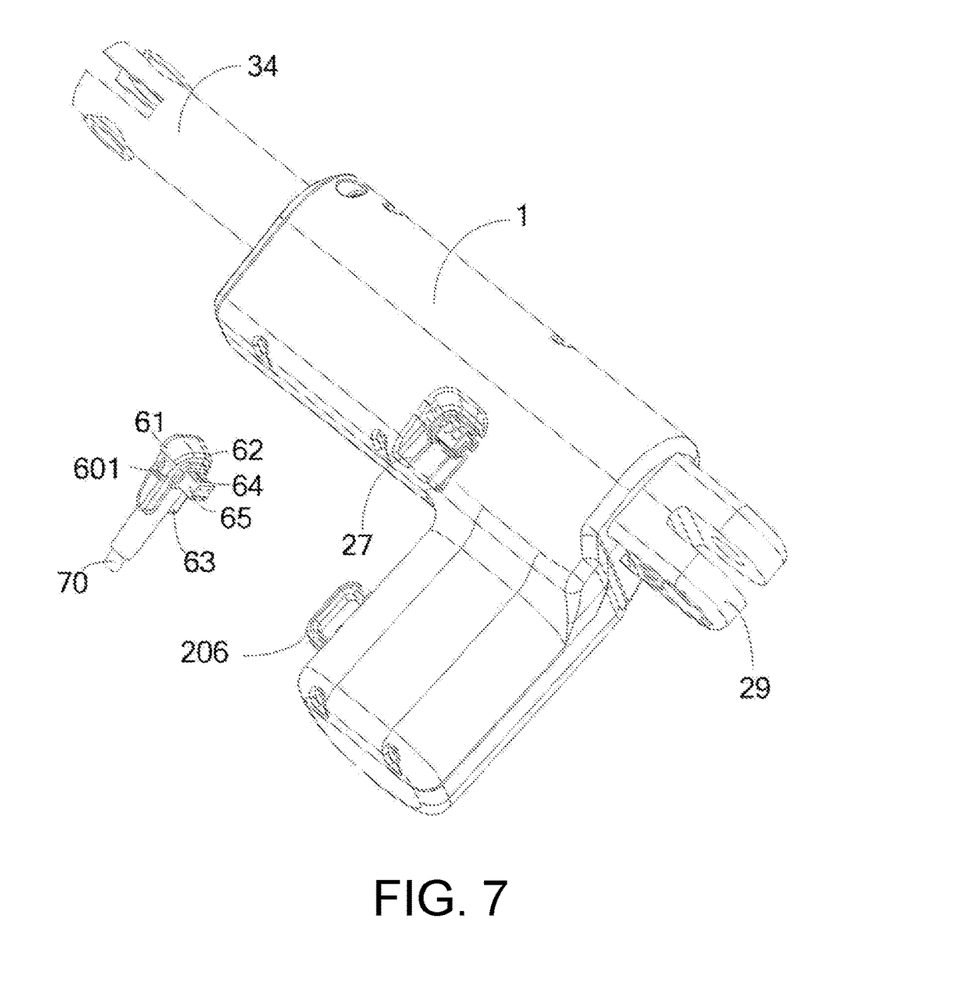
FIG. 7 is a structural view of the electric plug of the linear actuator provided by the embodiment of the present application.

As shown in FIG. 7, the electric plug 60 includes a body 61 and a drive seat 62 disposed within the body 61 and having connection terminals. The drive seat 62 is connected to an external cable 70. The external cable 70 is an electric wire configured outside the housing 1 of the linear actuator. The body 61 is provided with an ornamental housing, and an outer shape of the ornamental housing is consistent and coordinated with the overall design the housing 1 of the linear actuator.

Referring to FIG. 4, as an embodiment of the mounting component, the mounting component includes an electric plug mounting component and a housing mounting component coordinating with each other. The housing mounting component is disposed on sliding slots 271 arranged on edges of two sides of the plug-in window 273 and a limit rib 272 for guiding and limiting purposes. The electric plug mounting component includes a couple of snap joints arranged at two side of the body of the electric plug, including a left snap joint 601 and a right snap joint 602.

Furthermore, a plug cover 65 is disposed between the drive seat 62 and the connecting seat 52. The connection terminal of the connecting seat 52, such as a female terminal, and the connection terminal of the actuator seat 62, such as a male terminal, are connected in alignment via the plug cover 65. There are a plurality of mounting types for the plug cover 65. In one embodiment, the plug cover 65 is mounted on the drive seat 62 of the electric plug 60 and the connection terminal on the drive seat 62 is located inside the plug cover. In actual use, the plug cover 65 is aligned with the connecting seat 52 at the plug-in window 273 to complete the plugging operation. In another embodiment, the plug cover 65 may sleeve the connection terminals and mounted inside the connecting seat 52. After the mounting, the plug cover 65 is right at the plug-in window 273 of the housing 1. The plug cover 65 is further provided with an inner buckle 64. After the left snap joint 601 and the right snap joint 602 are buckled to the housing 1, the inner buckle 64 is configured to further fasten the electric plug 60 from inside.

For ease of assembly, the housing 1 includes a first housing 10 and a second housing 20 which are correspondingly provided with pre-assembled structure. One end of the first housing 10 forms a first half slot 15, the second housing 20 is provided with a second half slot 25 corresponding to the first half slot 15. The first half slot 15 and the second half slot 25 together define a housing outlet for allowing linear motions of the push rod assembly.

Figure 3:
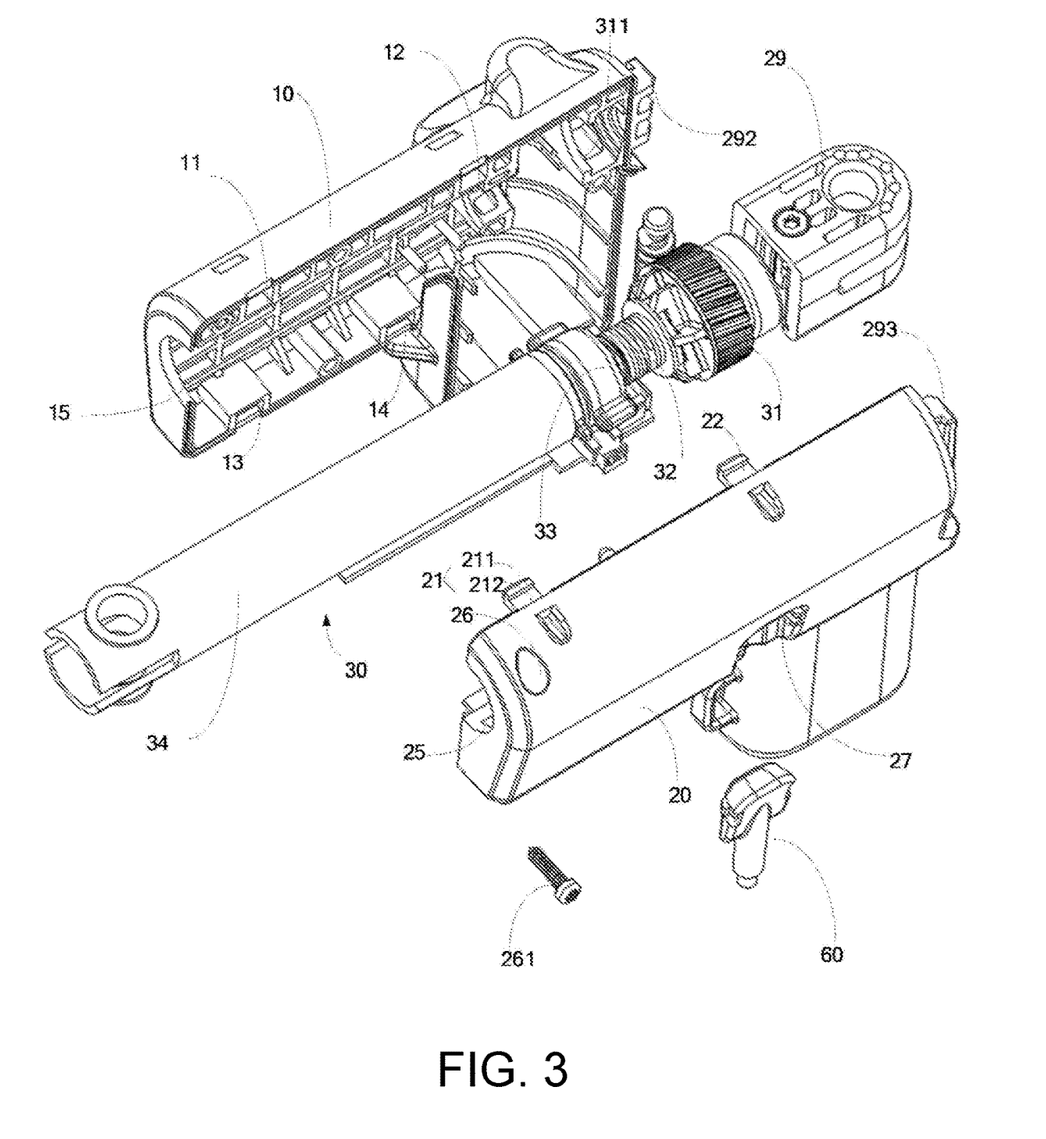
FIG. 3 is another exploded structural view of the linear actuator provided by the embodiment of the present application.

Referring together with FIG. 2, the pre-assembled structure includes a plurality of slots and buckles coordinating with each other, the first housing 10 being provided with the plurality of slots, such as slot 11, slot 12, slot 13, slot 14 and slot 18 as shown in FIG. 3. The second housing 20 is provided with the plurality of buckles corresponding to the slots. FIG. 3 shows the buckles 21 coordinating with the slots 11, and the buckles 22 coordinating with the slots 12. For locking the housing 1, the first housing 10 is further provided with a screw hole, such as the screw hole 16. The second housing 20 is arranged with a mounting hole 26 corresponding to the screw hole 16. After completing pre-assembly by using the slots and buckles, a screw 261 passes through the mounting hole 26 and is locked into the screw hole 16 so as to lock the first housing 10 and the second housing 20, the plug-in window 273 is defined in the first housing 10 or the second housing 20.

In the present embodiment, in order to realize the simple and quick assembly of the housing 1, the first housing 10 and the second housing 20 are finished pre-assembly fast via the coordination between the slots and the buckles. The first housing 10 and the second housing 20 are further locked together via a screw 261. Firstly, inner walls both of the housings are provided with buckle structures to buckle the two housings together. Furthermore, the two housings are further locked and fastened via the screw 261. The existing complex locking structure with a plurality of screws and a plurality of screw slots are been changed, and the improved housing assembled structure simplifies the assembly process of the linear actuator and reduces the cost.

In a particular implementation, the first housing 10 includes a first main housing 101 and a first auxiliary housing 102, and the second housing 20 includes a second main housing 201 and a second auxiliary housing 202. The first main housing 101 and the second main housing 201 enclose a mounting housing within which a mounting chamber is formed. The first auxiliary housing 102 and the second auxiliary housing 202 enclose a power housing, which further forms a power chamber 17 within which the motor 40 is mounted.

Referring back to FIG. 3, in a particular embodiment of the pre-assembled structure, the plurality of slots, such as slot 11, slot 12, slot 13, slot 14 and slot 18, are respectively disposed at a periphery edge of an inner wall of the first housing 10; the plurality of buckles coordinating with the slots for the pre-assembly are disposed convexly at a periphery edge of an inner wall of the second housing 20. Each buckle, like the buckle 21, has an arm extending from the inner wall of the second housing 20 and a clasp 212 disposed at an end 211 of the buckle. The clasp of the buckle is buckled to a corresponding slot. For example, the buckle 21 is buckled to the slot 11, and the buckle 22 is buckled to the slot 21.

Figure 5:
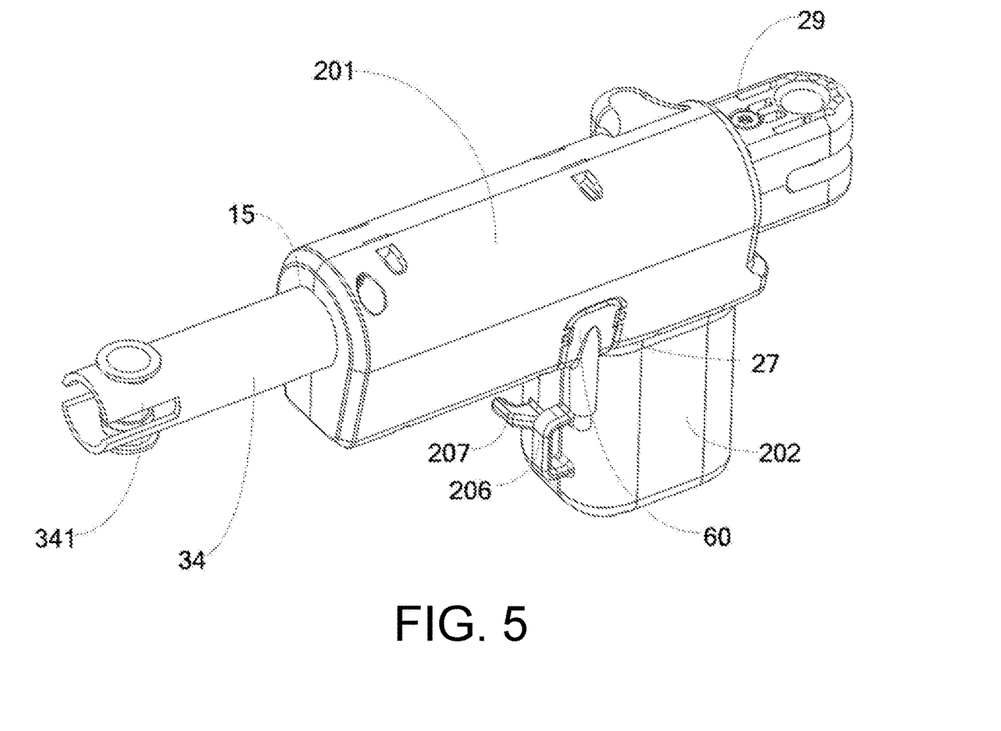
FIG. 5 is a view showing an assembly relation between the housing and the electric plug of the linear actuator provided by the embodiment of the present application.

Referring to FIG. 4 and FIG. 5, a wire containing mechanism is disposed at the power housing close to the plug-in window 273. The wire containing mechanism in the embodiment includes a wire containing component 206 and a wrapping post 207 which are disposed on the power housing. When the linear actuator is not in use, the unplugged electric plug 60 may wind around the wire containing mechanism. In use, an external cable 70 of the electric plug 60 is folded and passes through the wire containing component 206 and winds around the wrapping post 207.

The spindle assembly includes a spindle 32 and a bevel gearwheel 31 which is integrally formed with the spindle. An output of the motor 40 is connected to a motor shaft 42, and the bevel gearwheel 31 engages with the motor shaft 42.

As an embodiment of the spindle assembly, for saving working procedures and cost, the bevel gearwheel 31 and the spindle 32 constitute a plastic component molded in one-piece. In the embodiment, the spindle 32 and the bevel gearwheel 31 located at one end of the spindle 32 are molded in one-piece, forming a plastic gearwheel-spindle structure. The integrated plastic gearwheel-spindle structure is applied to a small-force linear-motion application field. The integrated injection molding process of spindle 32 and bevel gearwheel 31 may lessen production procedures on one hand, on the other hand, may also guarantee structural stabilities between the spindle 32 and a spindle nut 33, and between the bevel gearwheel 31 and the motor shaft 42. Furthermore, the integrated structure of the plastic spindle 32 and bevel gearwheel 31 molded in one-piece may guarantee working stability in low-force linear-motion application field, at the same time, lower the cost of the linear actuator.

The push rod assembly includes the spindle nut 33 sleeving around and engaging with the spindle 32, a push rod 34 fixed onto the spindle nut 33.

As shown in FIG. 2, in order to provide stable linear motions, the mounting housing forms a support part 311 inside the mounting chamber. A bearing 35 is fixed onto one end of the spindle 32 via a screw 351. The bearing 35 is supported on the support part 311.

Wherein, the limit switch is mounted on the circuit board 50. The limit switch includes a first microswitch 54 and a second microswitch 55 which are all mounted on the circuit board. The connecting seat 52 is disposed on the circuit board 50.

Figure 6:
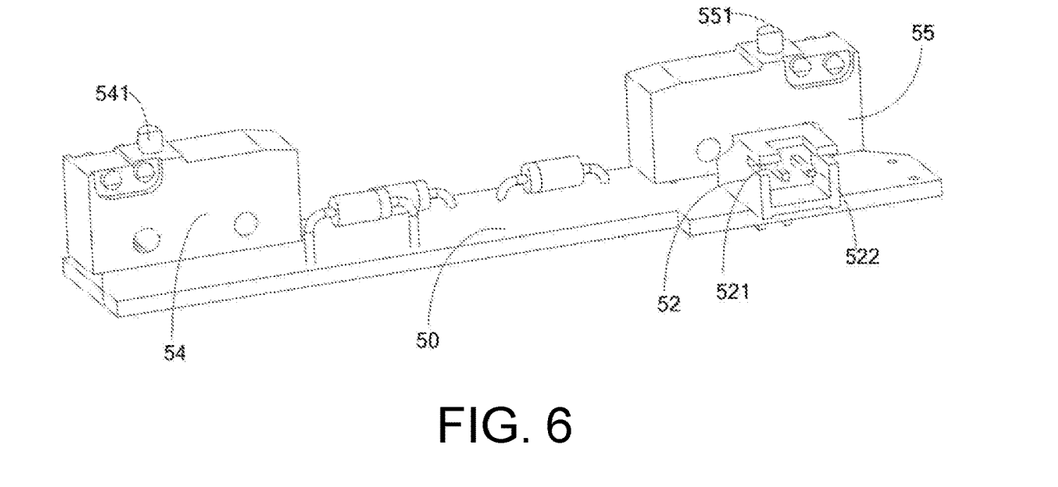
FIG. 6 is a structural view of a circuit board of the linear actuator provided by the embodiment of the present application.

As shown in FIG. 6, the first microswitch 54 is provided with a first limit convex brim 541, and the second microswitch 55 is provided with a second limit convex brim 551, the spindle nut 33 is disposed between the first microswitch 54 and the second microswitch 55. An external edge of the spindle nut 33 is limited between the first limit convex brim 541 and the second limit convex brim 551, so as to limit the stroke of the spindle nut 33 on the spindle 32, thus determining an operation stroke of the push rod 34.

The push rod 34 is hollow for assembling the spindle 32 and the spindle nut 33 and providing a moving space for linear motions of the spindle nut 33. For extending a connection between the linear actuator and associated parts, a free end of the push rod 34 is provided with a mounting slot to form a connecting portion 341. The connecting portion 341 is provided for pivotally connecting a riveting component 342 of the associated parts.

For extending relative components, the mounting housing is provided with a pre-positioning component at its one end away from the push rod 34 but close to the motor 40. As shown in FIG. 3, the pre-positioning component is form on a raised side 292 disposed at an end of the first housing 10, and a raised side 293 disposed at an end of the second housing 20. A mounting portion 29 is detachably fixed onto the pre-positioning component.

In the present embodiment, the detachable, replaceable mounting portion 29 is a detachable component of the linear actuator, which is equipped with different types for ease of the application of the linear actuator. The mounting portion 29 is locked to the housing 1 via the screw 291. The mounting portion 29 forms a pivot mechanism for better connecting to adjacent parts or assembling a link mechanism. Based on requirements of a device to which the linear actuator is specifically applied, loosen the screw 291 so as to change connection orientation of the pivot mechanism by the mounting portion 29, achieving 90 degree of position rotation.

In the linear actuator of the embodiment, the circuit wiring of the electric components inside the housing 1 are centralized in the circuit board; the connecting seat is disposed on the circuit board 52; the connection terminals are centralized on the connecting seat 52; the plug-in window 273 is provided on the housing 1, and all the wires are configured externally. When the linear actuator is applied to a particular device, the wires may be conveniently replaced based on the particular device. By plugging a single electric plug 60, the wires may be adjusted or replaced conveniently. At the same time, the setting of the electric plug 60 reduces the quantity of interfaces provided on the housing 1, and integrates prior multiple interfaces into one single plug-in window 273, achieving an ease-of-use experience for the linear actuator with an aesthetic design at the same time.

Above all, in the linear actuator of the present embodiment, for mounting the housing 1 simply and fast, the first housing 10 and the second housing 20 are pre-assembled fast via the coordination between the slots and the buckles. The first housing 10 and the second housing 20 are further locked together via the screw 261. Inner walls of the first housing 10 and the second housing 20 are both provided with buckle structures to buckle the first housing 10 and the second housing 20 together. Furthermore, the two housings are further locked and fastened via the screw 261. Furthermore, merely the plug-in window 273 is disposed on the housing 1 of the linear actuator; the wires inside the housing 1 are centralized on the connecting seat 52 so as to simplify inner wiring design of the device; at the same time, the electric plug centralizes all the external cables in a bundle and achieve external cables are set up externally. When the linear actuator is applied to different devices, different wires may be replaced merely by plugging and unplugging simply and conveniently according to particular requirements of the devices. In addition, the circuit board 50 disposed inside the housing 1 integrates the connecting seat 52 as a female seat of the wires. The connecting seat 52 is located behind the plug-in window 273 for the ease of connection to the electric plug 60 fast. At the same time, the mounting portion 29 provided by the linear actuator, as a detachable component, is equipped with different types capable of detaching and replacing for ease of promoting application of the linear actuator. The plug-in window 273 provides a plurality of limit ribs 272 for guiding and limiting purposes, the limit ribs being for, together with the snap joint 601 and the snap joint 602 on the electric plug, fixing to the electric plug. Furthermore, the spindle and the bevel gearwheel located at a front end of the spindle constitute a plastic component mold in one-piece with a stable structure. The integrated structure of the spindle 32 and bevel gearwheel 31 molded in one-piece may lessen production procedures for a component; furthermore, in a low-force linear-motion application scenario, transmission function and performance of the linear actuator remain unchanged, however, changing a metal component to the plastic component may lower the cost for the linear actuator.

Disclosures above only describe embodiments of the present application, and should not be deemed as limiting the protection scope of the present application. Equivalent structures or procedures made based on the specification and drawings, or applied to alternative associated technical areas directly or indirectly should also fall within the protection scope of the present application.

What is claimed is:

1. A linear actuator, comprising:
   a housing, dented to form a concave area, and having a plug-in window that is disposed on the concave area;
   a spindle assembly assembled in the housing;
   a push rod assembly assembled in the housing and driven by the spindle assembly;
   a limit switch assembled in the housing and disposed on a circuit board for limiting stroke of the push rod assembly; and
   a motor assembled in the housing for driving the spindle assembly,
   wherein a connecting seat is fixedly disposed on the circuit board for centralizing connection terminals, the motor is electrically connected to the connection terminals, the plug-in window is aligned to the connecting seat, an electric plug is pushed through the plug-in window and plugged into the connecting seat, the electric plug and the housing are fastened together by a mounting component,
   the connecting seat is integrated to the circuit board, and is correspondingly located at the plug-in window.

2. The linear actuator of claim 1, wherein the housing comprises a first housing and a second housing, the first housing and the second housing are correspondingly provided with a pre-assembled structure.

3. The linear actuator of claim 2, wherein the pre-assembled structure includes a plurality of slots and buckles that cooperate with each other, the first housing is provided with the plurality of slots, the second housing is provided with the plurality of buckles, the first housing is further provided with a screw hole, the second housing is provided with a mounting hole corresponding to the screw hole; after completing pre-assembly, a screw is passed through the mounting hole and is locked into the screw hole so as to lock the first housing and the second housing, the plug-in window is disposed in the first housing or the second housing.

4. The linear actuator of claim 3, wherein the plurality of slots are disposed at a periphery edge of an inner wall of the first housing; the plurality of buckles respectively coordinating with the slots for the pre-assembly are disposed at a periphery edge of an inner wall of the second housing, each buckle comprises an arm and a clasp.

5. The linear actuator of claim 4, wherein the spindle assembly comprises a spindle and a bevel gearwheel which is integrated molded with the spindle, an output of the motor is connected to a motor shaft, the bevel gearwheel is engaged with the motor shaft.

6. The linear actuator of claim 5, wherein the push rod assembly includes a spindle nut sleeving around and engaging with the spindle, and a push rod fixed onto the spindle nut.

7. The linear actuator of claim 6, wherein the push rod is hollow, and a free end of the push rod is provided with a mounting slot to form a connecting portion.

8. The linear actuator of claim 6, wherein the limit switch is mounted on the circuit board, the limit switch comprises a first microswitch and a second microswitch, which are mounted on the circuit board.

9. The linear actuator of claim 8, wherein the first microswitch is provided with a first limit convex brim, and the second microswitch is provided with a second limit convex brim, the spindle nut is disposed between the first microswitch and the second microswitch, an external edge of the spindle nut is limited between the first limit convex brim and the second limit convex brim, so as to limit stroke of the spindle nut on the spindle, thus determining an operation stroke of the push rod.

10. The linear actuator of claim 5, wherein the bevel gearwheel and the spindle constitute a plastic component by integrated molding process.

11. The linear actuator of claim 10, wherein the mounting component includes an electric plug mounting component and a housing mounting component that coordinates with each other, the housing mounting component comprises sliding slots disposed on edges of two sides of the plug-in window and a limit rib, the electric plug mounting component is a snap joint.

12. The linear actuator of claim 10, wherein the electric plug comprises a body and a drive seat with connection terminals, the drive seat is disposed in the body and connected to an external cable.

13. The linear actuator of claim 10, wherein the housing is arranged with a wire containing mechanism comprising a wire containing component and a wrapping post, the external cable is connected to the electric plug while passing through the wire containing component and/or winding around the wrapping post.

14. The linear actuator of claim 12, wherein a plug cover is disposed between the drive seat and the connecting seat, the connection terminals of the connecting seat and the connection terminals of the drive seat are connected in alignment via the plug cover.

15. The linear actuator of claim 10, wherein the housing is provided with a pre-positioned component, a mounting portion is detachably fixed onto the pre-positioned component.

16. The linear actuator of claim 6, wherein the bevel gearwheel and the spindle constitute a plastic component by integrated molding process.

17. The linear actuator of claim 8, wherein the bevel gearwheel and the spindle constitute a plastic component by integrated molding process.

18. The linear actuator of claim 9, wherein the bevel gearwheel and the spindle constitute a plastic component by integrated molding process.

* * * * *

UNITED STATES PATENT AND TRADEMARK OFFICE
CERTIFICATE OF CORRECTION

| | | |
|---|---|---|
| PATENT NO. | : 11,218,052 B2 | Page 1 of 1 |
| APPLICATION NO. | : 16/584895 | |
| DATED | : January 4, 2022 | |
| INVENTOR(S) | : Christian Gassner | |

It is certified that error appears in the above-identified patent and that said Letters Patent is hereby corrected as shown below:

On the Title Page

Replace the current entries with the following:

Item (71) Applicant: Iimoss (Dongguan) Co., Ltd., Guangdong (CN)

Item (73) Assignee: Iimoss (Dongguan) Co., Ltd., Guangdong (CN)

Signed and Sealed this
Twenty-seventh Day of June, 2023

Katherine Kelly Vidal
*Director of the United States Patent and Trademark Office*